Apr. 10, 1923. 1,451,514
E. C. MILLER
AIR PRESSURE INDICATOR AND GAUGE
Filed Apr. 18, 1922
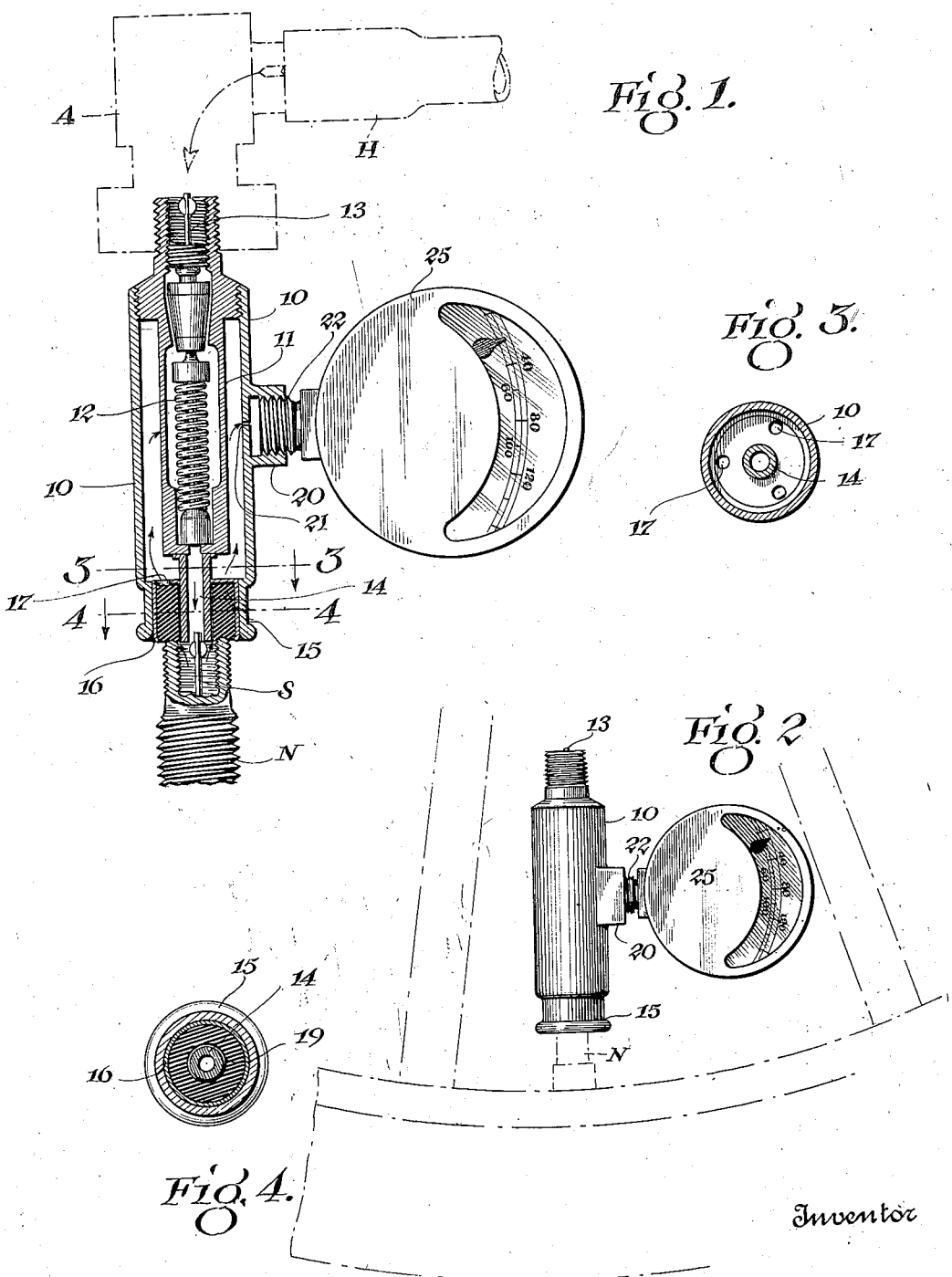
Inventor
E. C. MILLER.
By J. Clarkson
Attorney Patented Apr. 10, 1923.

1,451,514

UNITED STATES PATENT OFFICE.

EDWARD C. MILLER, OF WILLIAMSPORT, PENNSYLVANIA.

AIR-PRESSURE INDICATOR AND GAUGE.

Application filed April 18, 1922. Serial No. 554,479.

*To all whom it may concern:*

Be it known that EDWARD C. MILLER, citizen of the United States, residing at Williamsport, in the county of Lycoming and State of Pennsylvania, has invented certain new and useful Improvements in Air-Pressure Indicators and Gauges, of which the following is a specification.

This invention relates to pressure gauges such as are used for determining the pressure of air in pneumatic tires.

One very important object of the invention is to so improve the general construction of tire gauges as to provide a novel gauge which will be peculiarly efficient and especially adapted for use both in determining the pressure in a tire while air is being pumped into such tire and in determining the pressure at other times such as when on the road.

A second important object of the invention is to provide a novel construction of tire gauge in which, when used in connection with a pressure hose from a pump or tank in filling a tire, the pressure indicated will be the true pressure between that and the pressure in the pump or tank as is frequently the case in the other gauges used for this purpose.

With the above and other objects, in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a vertical section through the improved device with the pressure indicator itself shown in full lines, the view also showing the position of the pressure hose and tire nipple in their relation to the device when in use.

Figure 2 is a side elevation of the complete device, the view being to a reduced scale.

Figure 3 is a section on the line 3—3 of Figure 1.

Figure 4 is a section on the line 4—4 of Figure 1.

It is to be understood that the various mechanical details shown in the present drawings and hereinafter described are merely typical of one convenient manner of constructing the invention and that such details may be changed in the actual manufacture of the device for the market. As for instance the method and means of holding the various parts together and the proportions of the whole gauge or its different parts may be altered.

In the form shown, however there is provided a tubular casing 10 having a valve body 11 fitted in its upper end. This valve body is constructed and arranged in a manner similar to the usual tire nipple and like it is provided with a valve arrangement 12 of any preferred type so long as it opens downwardly under air pressure or pressure on the stem 13. It is accordingly not deemed necessary to enter into a description of the details of this valve arrangement since such details form no specific part of the present invention.

From the lower end of the valve body 11 extends a tube 14 which terminates flush with the reduced lower end 15 of said casing. Fitted within this end 15 is a gasket cage 16 having a central opening through which the tube 14 passes and being also provided with a series of openings 17 surrounding said central opening. These openings 17 may be of such size and number and in such position as to suit the requirements of the particular case but it is found advisable to have them located somewhat nearer the outside of the cage than its center. Within this cage is a rubber gasket 18 which has a central opening 19 fitting loosely over the tube 14 so that a slight annular space is left between the tube and the gasket.

Located centrally of the length of the casing 10 is a boss 20 which is hollow and communicates with the interior of the casing 10 by means of a minute orifice 21. In this boss is screwed the stem 22 of an ordinary commercial air pressure gauge 23 which has a range and graduations suitable for the requirements of tire work.

It is to be noted that the bore of the tube 14 is such that the valve stem S of the usual tire nipple N will be engaged and opened when placed on the nipple as shown in Figure 1 and pressure is excited to force the same against such nipple either by direct force or force applied through the angle valve A of an air hose H at the opposite end of the casing.

In operation the device is placed on the nipple and pressure is exerted in the usual manner. If it is simply a question of determining the air pressure in a tire the filling hose is, of course, not used. In this case the valve 12 does not open but the stem S of the tire nipple is depressed and opens the tire valve. With the tire valve open air flows up through the opening 19 and back of the gasket and escapes into the casing through the opening 17. From there it passes into the gauge 23. When the head or angle valve A is used the air enters the tire through the pipe 14 and then backs up through the route just described thus ensuring true indication of the tire pressure.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a tire gauge, a casing having an inlet at one end and an outlet at the other, a tubular conduit extending through said casing from end to end thereof, a check valve in said conduit and opening toward the outlet end of the casing, a gasket loosely surrounding the conduit at the outlet end of the casing, and a pressure indicator having communication with the interior of said casing.

2. In a tire gauge, a casing having an inlet at one end and an outlet at the other, a valve cage extending into said casing from the inlet end thereof and provided with a valve opening toward the outlet end, a partition across said casing adjacent the outlet end, and having openings to permit communication from the outlet and into the body of the casing, a compressible gasket held in said outlet end, a tube communicating with the valve cage and extending through said portion to permit passage of air from the valve cage to a tire nipple, said gasket surrounding the end of said tube loosely to permit air from a tire nipple, to pass into the body of the casing, and a pressure indicator having communication with the interior of the casing body.

In testimony whereof I affix my signature.

EDWARD C. MILLER.